(12) United States Patent
Potts

(10) Patent No.: US 6,959,882 B1
(45) Date of Patent: Nov. 1, 2005

(54) WATERING AND AERATING SOIL WITH A DRIP LINE

(76) Inventor: David A. Potts, 385 Roast Meat Hill Rd., Killingworth, CT (US) 06419

(*) Notice: Subject to any disclaimer, the term of this patent is extended or adjusted under 35 U.S.C. 154(b) by 84 days.

(21) Appl. No.: 10/460,853

(22) Filed: Jun. 13, 2003

Related U.S. Application Data

(60) Provisional application No. 60/391,512, filed on Jun. 24, 2002, provisional application No. 60/388,904, filed on Jun. 14, 2002.

(51) Int. Cl.$^7$ ............................................. B05B 15/00
(52) U.S. Cl. ..................... 239/542; 239/11; 239/548; 239/553.3; 137/78.2
(58) Field of Search .................. 239/542, 11; 137/78.2

(56) References Cited

U.S. PATENT DOCUMENTS

| | | | |
|---|---|---|---|
| 3,917,174 A * | 11/1975 | Hildebrandt et al. | 239/542 |
| 5,628,462 A | 5/1997 | Miller | 239/542 |
| 5,839,659 A * | 11/1998 | Murray | 239/1 |
| 6,018,909 A | 2/2000 | Potts | 47/58.1 |
| 6,173,526 B1 * | 1/2001 | Mazzei | 47/48.5 |
| 6,736,337 B2 * | 5/2004 | Vildibill et al. | 239/542 |

OTHER PUBLICATIONS

"Perc-Rite Drip Disposal Systems" 4 Page Brochure American Manufacturing Co. Undated.
"Aqua-Traxx Premium Drip Tape" 2 Page Brochure Toro AC Products Co. Undated.
"Pilot Study On The Impact Of Air Insected Into Water Delivered Through Subsurface Drip Irrigation Tape" p. 1-9, 19, 21, 22 California Agricultural Technology Institute, Feb. 2001.

* cited by examiner

*Primary Examiner*—David A. Scherbel
*Assistant Examiner*—James S. Hogan
(74) *Attorney, Agent, or Firm*—Michael A. Blake; Charles G. Nessler

(57) ABSTRACT

When the dripline used for watering soil, low pressure air in the range 10–100 inch water column is flowed through a buried dripline, in alternation of with flow of water at 5 psig or more. The flow of air provides oxygen to the soil, and more widely and evenly disperses the water within the soil, and impedes or counters saturation. A buried dripline runs in a U-shape path, so that low pressure and flow of air from emitters near the dripline terminal end is compensated for by higher pressure and flow of air near the inlet end. Flow of low pressure air or other gas, which pushes water from the dripline and surrounding soil, enables use of driplines in soil subject to freezing.

16 Claims, 3 Drawing Sheets

WATERING AND AERATING SOIL WITH A DRIP LINE

This application claims benefit of provisional patent application Ser. No. 60/388,904, filed Jun. 14, 2002 and Ser. No. 60/391,512, filed Jun. 24, 2002.

TECHNICAL FIELD

The present invention relates to irrigation and aeration of soil by means of small diameter buried conduits commonly called driplines.

BACKGROUND

One of the methods used for watering of plants, trees and other growing things is to flow water through a length of tubing, commonly referred to as a dripline. A dripline is typically comprised of small diameter plastic tubing, which has spaced apart water discharge points, or emitters, along the length of its sidewall. Watering of plants is most often accomplished by running a drip line at a shallow depth beneath the soil surface; alternately, the dripline is run along the surface of the earth. Running along the surface provides flexibility in re-positioning the lines and minimizes installation costs. Burial protects the lines from damage due to surface maintenance and use.

There is an obvious problem with respect to evenness of water distribution along the length of a dripline conduit, for instance one of 50 feet or more in length, if the spaced apart ports in the tubing are all the same diameter. Line loss in the tubing will mean there will be greater pressure and flows at points near the feed end than at the far end. Variation in earth-surface elevation or depth of burial will create pressure variations in a dripline. To address these factors, certain commercial products have pressure compensating exit ports, or emitters, at the locations where the water discharges. Commercial examples include Rainbird™ LD-06-18-500 tubing (Rainbird, Inc., Azusa, Calif.) and Part No. 08-WRAM.6-24V tubing (Netafim USA, Fresno, Calif.). Typically, such emitters throttle water flow, to make it independent of pressure, so long as pressure in the dripline by the emitter is above a certain threshold, for example, above 5 pounds per square inch gage (psig). See U.S. Pat. No. 5,628,462 to Miller, and product literature of the aforementioned manufacturers, about pressure compensating emitters.

When water flows through the emitters of a buried dripline into the soil, the water disperses according to the characteristics of the soil. In typical soils there is a localized concentration of water near the emitter, whereas it is preferable that the water be dispersed. The present invention is founded on the observation that, where soil is saturated on a persistent basis, dripline irrigated soil will have inferior conditions for vegetative root growth. In particular, there will tend to be a resultant localized deficit in oxygen. In other respects, as a corollary, the local composition of soil gas maybe quite different from atmospheric air, and quite different from areas remote from the emitter region. Furthermore, if the water being distributed contains organic substances, especially fertilizers, or if the water is wastewater, having a biological and or chemical oxygen demand, then the organic materials in those waters can accumulate in vicinity of the emitters, to the extent of making the soil condition adverse to plant growth. Thus, commercial driplines and practices present limitations, which if overcome can present better growing conditions and better capacity to utilize wastewater.

In the prior art, air has been flowed through soil to enhance conditions in the soil, to improve plant growth, for instance in the turf of golf greens, sports fields, and the like. See U.S. Pat. No. 6,018,909, Subsurface Soil Conditioning to Potts, applicant herein, and the references cited therein. Driplines have been used to add oxygen for crop growing purpose, by mixing atmospheric air into the water as it is flowed into the dripline, to enhance the amount of oxygen carried by pressurized water in the dripline. See U.S. Pat. No. 6,173,526 to Mazzei.

SUMMARY

An object of the invention is to improve the functioning of driplines in ways which better engender better irrigation, and provide improved conditions for growing vegetation. A further object is to improve the extent to which nutrient bearing water, such as domestic wastewater, can be handled in driplines. A still further object is to improve the usefulness of driplines in soil that is subject to freezing.

In accord with the invention, low pressure air is flowed through a dripline buried in soil, in alternation with higher pressure water flow. Typically, air pressure will be in the range of 10–100 inch of water column (iwc) while water pressure will be 5 psig or greater (>138 iwc). Preferably the dripline is buried 1–12 inches beneath the soil depth, more preferably 6–12 inches. The burial in the soil is sufficient to create significant resistance to airflow through the soil, from emitters to atmosphere. The soil flow resistance causes a better distribution in flow amongst emitters, and lowers the percentage pressure drop along the length of the dripline, compared to what occurs in an insufficiently buried dripline. Preferably, the pressure at the terminal end of a dripline length will be at least 20% of the inlet end pressure.

In further accord with the invention, air in the dripline is maintained at a pressure sufficiently low to avoid a tendency for increased air flow rate through localized regions of the soil which are found to have flow resistance due, for example, regions which are less compacted than the surrounding soil.

In still further accord with the invention, water is flowed for a first period of time. The dripline is then drained by gravity or by low air pressure or by a combination of the two. Water drains from the emitters or from drain points other than emitters or a combination of the two. Air is then flowed through the dripline, out the emitters and through the soil. The cycle is repeated numerous times. The frequency and duration of flow of each fluid will depend on the particular soil conditions, atmospheric conditions, plant uptake, microbiological activity, etc. Usually, it is an aim to maintain the oxygen content in the range of 19–21%. In many instances, in the absence of the invention and airflow, the oxygen content of the soil may drop to 15% or less.

Airflow, when it is alternated with water flow, better distributes water within the soil, providing better irrigation. The physical displacement of water from within the dripline and from the soil adjacent the emitters, also enables use of driplines in soils which freeze. Air provides beneficial oxygen which enhances soil conditions and growing of plant matter. Another active gas may be used in place of air. The use of the invention enables the use of nutrient bearing wastewater for irrigation, or simply for disposal. It decreases unwanted build up of organic matter in the soil, especially in vicinity of the emitters, which would occur in absence of the periodic airflow.

In another aspect of the invention, a dripline fed from one end only is run in a U-shape loop or an approximation, so the terminal end is near the inlet end and the opposing legs of the loop are relatively close to one another; and, a multiplicity of side-by-side U-shape loops may be used. Thus, the lower airflow near the far end, due to pressure loss along the line, is compensated for by the higher airflow near the inlet end, since the airflow spreads the water and air laterally in the soil and there is overlapping effect between the mating legs.

The foregoing and other objects, features and advantages of the invention will become more apparent from the following description of preferred embodiments and accompanying drawings.

DESCRIPTION

Figure 1:
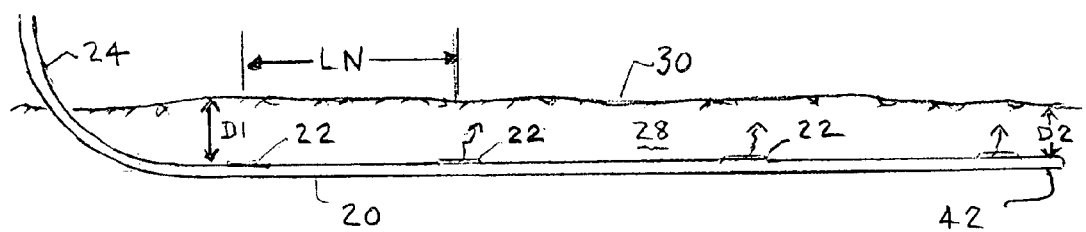
FIG. 1 is a vertical elevation cross section through a soil profile showing a buried dripline.

In the invention, air is flowed through a pressure compensated port type of dripline 20, in alternation with water. The dripline is buried in the soil at certain critical depth. In the preferred practice of the invention, the dripline is a commercial type, for instance, Part No. 08-WRAM.6-24V tubing (Netafim USA, Fresno, Calif.); alternatively, Rainbird LD-06-18-500 tubing (Rainbird, Inc., Azusa, Calif.) is used. In the examples below, the Rainbird™ dripline is used.

In the invention, low air pressure is applied to the inlet end of a dripline. Pressure in inches of water column (iwc, gage pressure) will range from single digits and 100 inches or more. For example, a typical pressure might be in the range of 10–60 iwc. As will be appreciated from the further description, airflow through soil is a function of the air pressure applied to the dripline. In the invention, it is desirable to have sufficient, but not excessive airflow through the soil. The airflow ought to be sufficient to provide oxygen to the soil in a quantity that compensates, to some consequential degree, for a deficiency in oxygen which would otherwise occur. That deficiency can arise from various factors which include: displacement of soil gas by dripline or other water, respiration attendant to plants, microbiological activity, and decomposition of organic substances. Other active gases may be used in substitution of air, in the generality of the invention. For instance, mixtures of gases such as nitrogen and carbon dioxide and oxygen may be used. Of course, during its passage through the soil, the composition of the air will be altered. Some of the air may be taken up in the soil. For instance, the oxygen may be significantly depleted and the carbon dioxide, methane and water content may be increased.

The pressure ought to be kept low enough to avoid undesirable effects, such as excess flow of dry air, which dries out the soil; such as excessive cost for providing air; and, such as "blow outs" which result from excess subsoil pressure adjacent the emitters. A blowout, as the term is used here, refers to significant redistribution of airflow, toward flow through certain "weak regions" of the soil. For example, there may be a less dense area in the soil in vicinity of the emitter, because of natural variations in the soil, because soil associated with trenching and burying of the dripline is uncompacted, or because of activities of insects or worms or plant roots. Since a weak region is by definition more permeable than the surrounding soil, there will be preferential airflow through the weak region, when air pressure is first applied to a dripline. Nonetheless, the net result of airflow through both the weak region and the surrounding soil will be to obtain a certain average flow of air, a certain average pressure in the dripline, and a certain average pressure in the soil in vicinity of the emitters. But, if the air pressure in the dripline and at the emitter exits is too high, the air will tend to eject or push aside looser soil or other material in one or more weak regions of the soil. That will increase the flow capacity of the weak region. Thus, the subsurface pressure distribution will be unfavorably altered, and generally the average pressure beneath the soil in vicinity of the emitters will be lowered, for a given flow rate. The weak region in the soil acts as does a lowered pressure relief valve on a pneumatic tank or piping system. So, the desired diffuse airflow through the soil surrounding the weak region which was originally obtained will be lessened, and the desired effects of the airflow may not be achieved except closely adjacent the blowout region. Even when there are not localized weak regions, air pressure which is too high with respect to the permeability or flow capacity of the soil might lift a portion of the overlying soil as a mass, in a massive blow out. Such an effect would be quite undesirable in the context of how driplines are ordinarily used, even though in other contexts the lifting effect might be useful.

The air pressure necessary will vary with the soil class and other properties. Experience thus far shows that the low pressures described herein are generally effective. Of course, there will be soils where the invention may not work effectively, irrespective that the dripline pressure is low. For instance, the soil may have too many regions which are, initially, channels of high flow capacity, and which undercut the capacity of creating a sufficient average pressure within the soil at the elevations of the emitters. Or, the soil may be of such high permeability, such as coarse sand, that no consequential subsurface pressure can be built up.

Air may be supplied by a regenerative blower or other comparable source of low pressure air. A preferred air source is a Model R4P115 regenerative blower (Gast Mfg. Co., Benton Harbor, Mich.). Sometimes regenerative blowers are referred to as ring compressors and they are typically used to provide pressures in the 2–240 iwc range. Their output is termed low pressure here. The pressures used with the invention contrast that the 1–2 iwc range pressures typical of small single stage blowers, and with the 10–125 psig (about 250–3500 iwc), or more, pressures commonly associated with small air compressors, used for light industrial and craftsman purposes. Obviously, higher pressure sources can be throttled to low pressures needed for the invention.

The Rainbird commercial dripline emitters are presented as "pressure compensated emitters". That means that once a critical dripline pressure is reached, of the order of 5 psi, the water flow through an emitter is substantially independent of pressure increase. See the prior art description and the disclosure in U.S. Pat. No. 5,628,462 to Miller. Thus, with water, so long as the pressure at the far end of a dripline is above the critical pressure, the flow through emitters near the higher pressure inlet end is comparable to those at the lower pressure far end. The pressure drop along the length of a 300 foot dripline, described in an example below, with a 0.6 gph flow per emitter, might be around 15 psi. So, provided the inlet end pressure is about 20 psi or higher, the critical flow rate in all emitters is reached. Typically, inlet end pressures of about 20 to 60 psi are used commercially and in the invention. Water may be provided from public taps or an ordinary pump or other source.

In commercial prior art practice, driplines may often be run along the surface, or more preferably, they will be buried at shallow depths in the soil, for instance at 1 to 6 inches of depth. In typical agricultural soils, burial has negligible effect on water flow rate from the emitters since, with typical dripline pressures and emitter flow rates, the pressure drop through the soil due to passage of water is not significant. And, of course, the pressure-compensating behavior of the emitters would maintain flow even if the soil resistance was consequential to water flow. Thus, whether driplines are run on the surface or are buried is not consequential to the quantity of irrigation achieved. Generally it has been thought by many that that good crop root growth prevails in the soil region near the surface, e.g., in the top 6 inches, and it is within that region that driplines should deliver water. As indicated herein, watering by dripline or otherwise can inhibit the amount of soil oxygen which is present. And, that in turn can limit the depth to which roots grow. Within the invention, flowing air on a periodic basis enables driplines to be placed deeper than has been common, for instance at depths of 6, 8, 12 inches or more.

In the invention, depth is consequential to how air is flowed through the dripline, and driplines must be buried sufficiently. Since the emitters are necessarily designed for water flow, and since air has much lower viscosity than water, a typical emitter may provide lowered impedance to airflow. Thus, typical emitters will tend not to pressure compensate for airflow at low pressures used in the invention, as they do for water. Thus, if air only is flowed through a dripline which is laid on the surface, at the pressures and volumes indicated herein, the air can disproportionately flow through the emitters nearest the inlet end 24 of the dripline shown in FIG. 1. In an experiment with an about 300 foot unburied dripline, having about 200 emitters on 18 inch spacing, to which was applied low pressure air, the airflow issuing from emitters near the terminal end was hard to detect, compared to the detectable flow of air from emitters near the inlet end.

In experiments on dripline emitters using low pressures in the range of 2–15 iwc, when air pressure differential is increased, flow is not proportionately increased. The same non-linear behavior is expected in soil which resists passage of air. Thus, in practice of the invention, to obtain a given airflow, a higher pressure is necessary when a dripline is buried in soil which resists air flow, than is required to obtain the same flow through an unburied dripline. Although the analysis is complicated by the non-linearity of flow through emitters and soil as a function of pressure, to a first approximation, the flow loss along a given dripline length will be not greatly increased when a given dripline is buried and flow is maintained constant. Thus, when the higher pressure is applied to a buried dripline, to obtain the target flow, there is a decrease in the percentage of pressure difference within the dripline, which pressure is applied to terminal end emitters, compared to that applied to the inlet end emitters. Since that means there is less variation in pressure applied to the entrances to all emitters, there is a trend toward more even flow from all emitters. Furthermore, given the non-linearity of emitter flow, for any absolute amount of pressure increase, the flow through terminal end emitters will increase proportionately more than flow through inlet end emitters, further helping the desired trend toward uniformity. So, the combination of effects provides better distribution of low pressure air when the dripline is buried sufficiently in the right type of soil, then when it is not.

FIG. 1 is a vertical cross section through a soil profile, showing how dripline 20 runs generally along the contour of the soil surface at a depth of about 1–12 inches in soil, preferably 6 inches or more. The dripline pressure compensating emitters 22 are spaced apart a distance LN, typically 18 to 24 inches. During use, air and water are passed separately through the dripline. Air flowed into the dripline flows out of the emitters and mostly generally upward through the soil 28, toward atmosphere above the soil surface 30, as illustrated by the arrows in FIG. 1. Water may flow upwardly, sideways, or downwardly, within the soil, depending on soil conditions.

Dripline 20 may be 200–300 feet, or more or less, in length. In the invention, the dripline 20 is necessarily buried at a selected depth D beneath the surface 30 of the soil 28, which depth is sufficient to create resistance to the flow of air upwardly through the soil, and is sufficient to cause air to flow from all emitters along the dripline length, most importantly those at the terminal end 42. Depths here are the distance from the top of the emitters or other features to which reference may be made, to the nearest surface of the soil.

In general, in the invention, deeper burial is better since wider dispersion of air and water is achieved from any particular emitter. Uniformity of the burial depth D is preferred, but as a practical matter it may be difficult to achieve. In the invention, the depth of burial D may vary, as illustrated by the differing depths D1, D2, at the feed end and terminal end, respectively, shown in FIG. 1. In both instances, the depth D1 and D2 are great enough, so that the soil which locally overlies a particular emitter provides appreciable resistance to airflow from that particular emitter. Obviously, the soil resistance is more important at the inlet end, and in some cases it might be acceptable to have hardly any soil resistance for a few of the emitters near the terminal end or elsewhere. The average depth which achieves the objective of causing significant airflow along the length of the dripline is called here $D_{critical}$, or more simply $D_c$. For common northeastern U.S. topsoil with a U.S. government National Resources Conservation Service (NRCS) permeability class of moderate to slow, $D_c$ will be typically around 6 inches.

Mostly, it will be assumed and found that the character of the soil is nominally the same along the length of the dripline. But, if soil character varies greatly along drip line length, then in best practice of the invention, the dripline depth would be increased or decreased according to whether the soil was more or less permeable, in aiming for more or less uniform soil resistance above the dripline, and in aiming at least to obtain a flow through the terminal end emitters which is consequential compared to the inlet end emitters. By "consequential" is meant that the flow at the lowest flow emitters will be at least 20% of the flow at the highest flow emitters; that is, the ratio between the high and low flows (emitters) will be nor more than 5 to 1. Another alternative for dealing with soil and other variables which affect resistance is to have separately fed dripline portions, to make up the whole of a dripline length for an installation. FIG. 5 shows how air through line 70 and water through line 72 are alternately flowed down trunk line 80, and then through control valves V in branch feed lines, to zones ZA1, ZA2, ZB1, ZB2, etc.

In a preferred practice of the present invention, as illustrated by the example below, the soil desirably provides a resistance to flow, from an emitter on the path to the nearest surface, in the range of 1 to 35 iwc. Moisture in the soil can substantially affect the resistance of the soil to airflow. Thus, to obtain the desirable flow of air which characterizes the invention, it may be mandatory to wet the soil first. For instance, in an experiment with a dripline buried 6 inches in a commercial sand product, namely Filpro No.00 quartz sand (U.S. Silica Co., Berkley Springs, W. Va., US), with airflow of 0.5 cfh through an emitter, dripline pressure was around 12 iwc when the sand was dry. There was virtually no resistance or pressure drop between the emitter and the soil (sand) surface. When the sand wetted, as by irrigation through the dripline, the dripline pressure to obtain 0.5 cfh was 32 iwc. Thus, the wet sand resistance was about 17 iwc.

In absolute terms, there are relatively small pressure losses due to airflow along the length of the tubing. In the exemplary data of Table 1, the pressure drops along a 300 foot length of dripline, for flows of 30 and 174 cubic feet per hr (cfh), are about 7.5 and 20 iwc, respectively. However, the pressure drops are significant in percentage terms, ranging from 73 to 58% loss, which is related to the aforementioned 5 to 1 variation.

Figure 2:
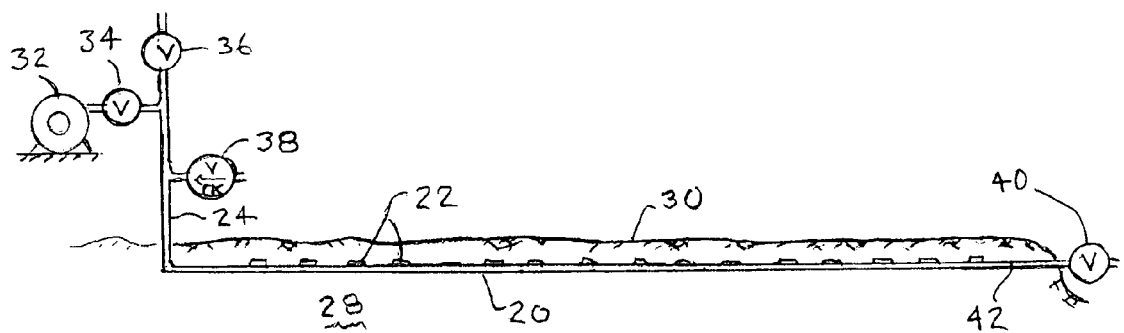
FIG. 2 is like FIG. 1, showing another installation with an air blower and an arrangement of various fluid control valves.

The water and air are repetitiously flowed in alternation. With reference to FIG. 2, in a process of the invention, the water is first flowed from an unshown pump or other source through inlet valve 36 and into the dripline. At a desired time, water inlet valve 36 is closed. Drain means, valve 40, which is at the terminal end 42 and is preferably at the lowest point of the dripline, is then opened and atmospheric air enters the inlet end 24 of the dripline 20 through check valve 38 or a substitute manual valve, as water drains by gravity through the drain means and probably through at least some emitters. When the line is drained, sufficiently to enable airflow through the line and out the emitters, valve 40 is closed. If the line is then not sufficiently drained, valve 40 can be left open for a while, so the initial air pressure applied in the next step helps force the water out. More than one drain means may be provided. In an alternate embodiment, when the dripline elevations and soil conditions permit, water will drain by gravity through the emitters, as air is allowed to enter check valve 38; and, no drain means at points separate from the emitters will be present. When the line is drained sufficiently, air from a blower 34 is flowed through valve 34 and into inlet end 24 of the dripline.

The water flow will be maintained for cumulative time periods sufficient to provide the desired quantities of water. The airflow will be maintained for cumulative durations sufficient to achieve the desired change gas content or dispersion of water in the soil. For instance, the respective durations may be a matter of minutes or hours, and may be determined by experiment and evaluation of the soil conditions. In a preferred practice, the air will be flowed for a longer cumulative period of time than is the water. A suitable automatic control system may be used.

Other layouts of the dripline may be used, than are showed in the examples. For instance, water and air maybe introduced at the middle or other point along the length of a dripline; the dripline may run in a tee, rectangle, circle, etc.

When water flows from an emitter in soil, in the absence of air, it will naturally tend to wet the local area around the emitter. Depending on soil class, homogeneity, and various other factors, water will tend to flow downwardly, sideways, and upwardly. Generally, it is an object to have the irrigation water spread sideways, so the soil is irrigated uniformly in the horizontal plane. That uniformity of effect is particularly desirable when the crop being grown comprises grasses and the like; for instance, for lawns, sports fields and golf courses, etc. However, because water is emitted at spaced apart points, there is an ordinary tendency for drier areas in soil which is in between the emitters. In the invention, when air is alternated with water flow, it is found that air physically displaces water, when the soil is saturated; and, the irrigation water is carried further from the emitter by subsequent flow of air, than occurs in absence of use of low pressure air. Thus, more uniform watering conditions result and more water may be beneficially added to a certain piece of land. When grasses are grown in otherwise arid conditions, the effect of air can be observed in the comparative uniformity of grass growth across the soil surface, compared to when air is not used.

The above described technique for providing air to the underside of soil with air pressure, which is low enough to avoid blowouts and excess flow through weak regions in the soil, is useful in other contexts where subsurface watering with driplines is not being used. For instance, the method is useful for flowing air upwardly through the soil profile of a golf green or other turf covered sports field surface, in accord with familiar prior art. It provides more uniform aeration, soil gas composition, and moisture content, than does a higher pressure. A too-high pressure tends to push loose matter in weak regions, such as worm holes, to the surface; thus, increasing mal-distribution of flow through such weak regions. When flow of low pressure air is carried out while rain is falling on the turf surface, rain water is better induced to flow off the surface, rather than through the soil profile.

The following is an example of the practice of the irrigation and aeration invention. Air was flowed through an about 300 foot length dripline. The Rainbird tubing had an inside diameter of about 0.57 inch and the about 200 emitters were 18 inch apart from each other. The dripline was buried in loamy soil to a depth of about 6 inches. When water was applied to the tubing at about 30 psi, a total flow of about 120 gallons per hour (about 0.6 gph per emitter) was observed. After water was drained from the tubing by use a drain valve and initial application of air pressure, air was flowed and pressures observed at the inlet and far ends of the tubing. The pressure applied by the regenerative blower to the inlet end of the drip line was changed to observe the flow behavior. See Table 1.

In another embodiment of the invention, the depth of the drip line can be varied along the dripline length, to make the flow resistance through the soil at the far end of the dripline less than at the inlet end. With reference to FIG. 1, the depth D2 may be made less than the depth D1, to make the resistive path shorter at the far ends of the tubing, where the air pressure inside the tubing is less. Obviously, the slope of the terrain, and how draining is achieved, are factors which may have to be taken into account when the depth is varied.

TABLE I

Flow characteristics of a 300 foot, 200 emitter dripline buried 6 inches deep in soil

| Total Air Flow SCFH | Average Flow per Emitter SCFH | Inches of Water Column | | | End-to-End | |
|---|---|---|---|---|---|---|
| | | Inlet End Pressure | Far End Pressure | Average Pressure | Pressure iwc | Drop % |
| 30 | 0.15 | 9.2 | 2.5 | 5.9 | 6.7 | 73 |
| 120 | 0.6 | 15.8 | 6.0 | 10.9 | 9.8 | 62 |
| 174 | 0.9 | 33.7 | 14.0 | 23.9 | 19.7 | 58 |

The following is another example of practice of the invention. A field of turf grass, of about 11,000 square foot area, was provided with drip lines having emitters 18 inch on center, buried at about 8 inch depth. Water was flowed through the drip line to thoroughly wet the soil, and thereafter it was flowed periodically for 5 days, to keep the soil moist. Air pressure was applied continuously at about 54 inch water column during the period, whenever the water was not flowing. Soil gas composition was measured at random places around the field at about 6 inch depth, at a fixed times during the 5 day period. Soil gas, initially at about 19% oxygen, gradually rose to 21%. This result compared with that measured in an adjacent comparable field, which had a dripline flowing water but no air. In the comparison field, oxygen content decreased from 19% to 15%, which decrease was attributed to natural change in soil temperature and concomitant increased microbiological activity. Thus, the effect of the air flowed through the dripline was to change a naturally occurring 15% oxygen content to a 21% content, so the soil gas oxygen content approximated atmosphere. Lesser airflow may be used, since if 19–21% soil gas oxygen content is obtained, that is much preferable to the naturally occurring 15%.

Figure 3:
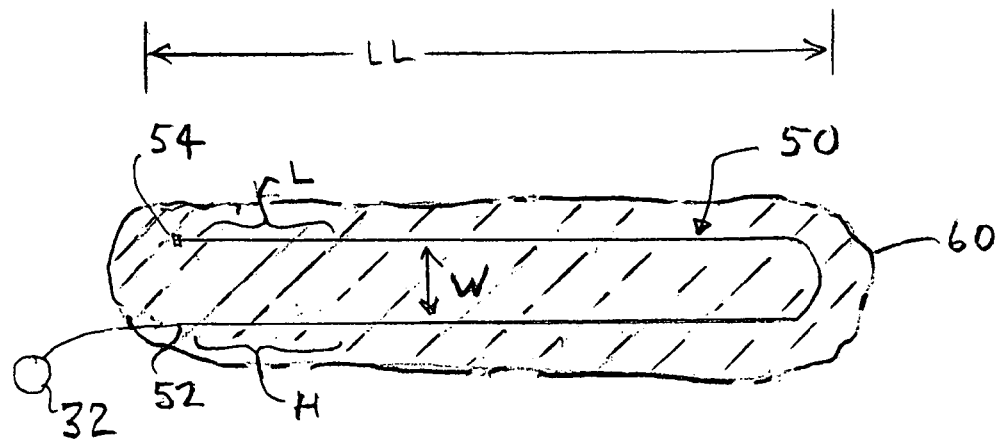
FIG. 3 is a top view of showing a subsurface layer of soil at the elevation of a buried U-shape dripline.
Figure 4:
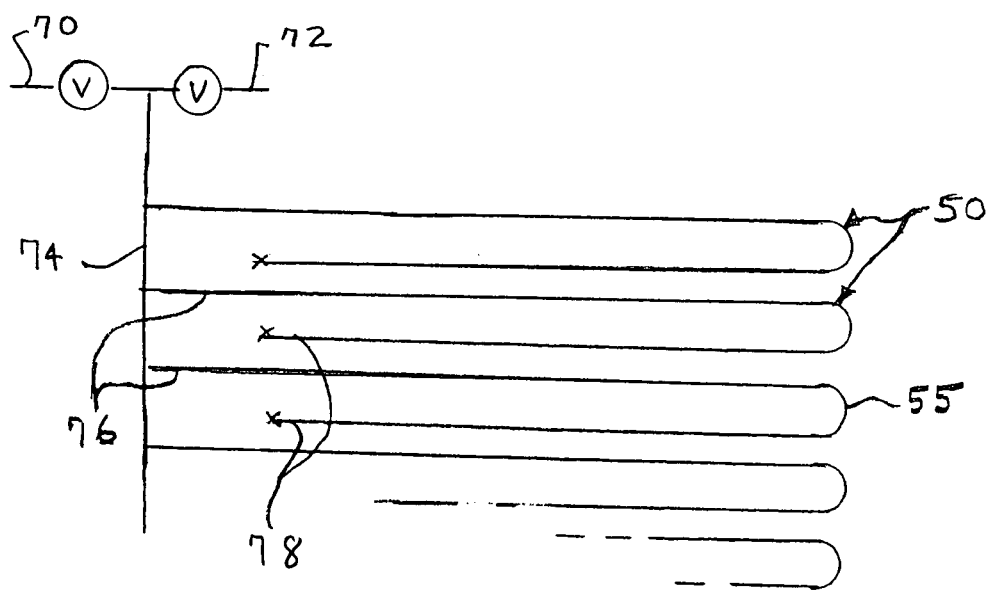
FIG. 4 is a top view showing the pattern of a multiplicity of buried U-shape driplines.
Figure 5:
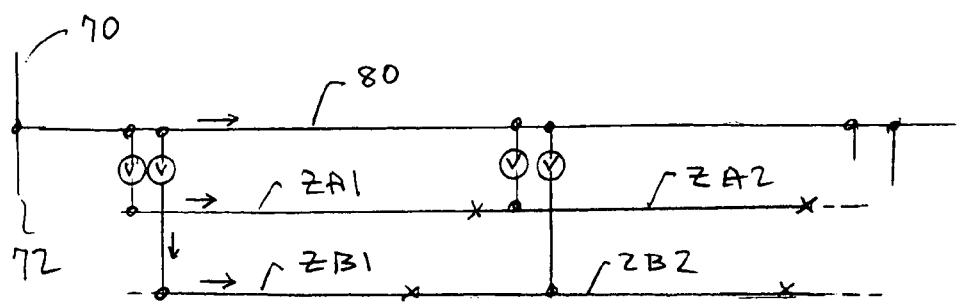
FIG. 5 shows how driplines can be zoned to compensate for variations in resistance of soil to air flow.

In still another embodiment of the invention, the drip line is run along a generally U-shape path to treat a region of soil 60. FIG. 3 is a schematic plan view of a buried drip line 50. The dripline, its burial, and the water and air parameters, accord with what is described above. When air pressure from source 32 is applied at the inlet end 52, air flows down the U-shape drip line 50 toward the closed terminal end 54. Due to flow loss, there is higher air pressure inside the line 50 in region H, near the inlet, than there is in region L, far from the inlet. Airflow from emitters in region H is thus higher than flow from emitters in region L. The spacing W of the two U-legs is made relatively small, for instance 18 inches or less, so that in the context of soil properties and emitter spacing, there is an area of overlapping lateral influence in the soil. Thus, the low airflow emitters in the leg near the terminal end is compensated for by high flow from the emitters in the mating leg, near the inlet end. Thus, on average, a relatively uniform flow of air will be distributed along the length LL of the soil area 60 being watered. FIG. 4 shows how a multiplicity of U-shape driplines are buried relative to each other, so that the inlet end leg 52 of a one U-leg runs parallel to the terminal end leg of the adjacent dripline U-leg. Thus, the legs of adjacent U-shape driplines overlap in influencing the soil therebetween, so the high airflow from one dripline leg compensates for the low airflow from the adjacent leg of the adjacent dripline, and there will tend to be uniformity across the field having driplines. Approximations of U-shape may be used. For instance, provided the U-shape has the legs which are generally parallel, the U-bottom element 55 may be other than curved; e.g., it may be is vee shape, straight or otherwise shaped. Furthermore, bottom element 55 may alternatively be made of conduit having no emitters.

For all foregoing embodiments, other gases may be substituted for air in part, and less likely in whole. Additions may be made of ammonia gas, or other gaseous nutrient or soil stimulant, or of pesticide or herbicide, or of an oxygenator, such as ozone.

The invention makes feasible the use of wastewater in irrigation by dripline, in particular wastewater of the type which is discharged from domestic dwellings, light industry and farms. Such the wastewater contains various organic compounds, such as nitrogenous compounds, and has a significant biological oxygen demand (BOD) and or chemical oxygen demand (COD). For instance, BOD/COD would be greater than 5 mg/L, commonly 100–400 mg/L, and sometimes greater than 1,000 mg/L. When wastewater is flowed through a dripline in sufficient quantity for irrigation, there may be an accumulation of organic matter in the soil, a deficit in oxygen, and an excess of certain other gases, especially in vicinity of the emitters, that would be adverse to plant growth or to continued processing of the wastewater in the soil. The periodic airflow provides oxygen for microbes and chemical reactions involving the organic matter in the wastewater, so it is treated within the soil, and so that good conditions for plant grow ensue.

In another variation on the invention, air is preferentially flowed through the dripline during part or all the time where there is significant natural rain, i.e., stormwater, falling onto the surface, in an alteration of whatever pattern of alternating water and air flow has been established for a soil area. The upward flow of air through the soil and through the surface inhibits the downward percolation of stormwater into the soil from the surface. As a result stormwater is forced to flow laterally upon the surface to a point remote from the area being treated by dripline. This procedure prevents unwanted saturation of the soil and maintains in it a capacity for receiving wastewater. It also avoids the deficiency of oxygen which can result simply because the soil becomes saturated with water. The method of flowing air only through the dripline, during part or all times when stormwater is falling on the surface of the soil containing the dripline, is useful irrespective of whether the water is wastewater or not.

Still another aspect of the invention is as follows. In colder climates a drip line, even if buried 6–8 inches or so beneath the surface of soil, can be subjected to freezing soil temperatures. The valves and other devices associated with the drip line can also freeze. Yet, it may be desirable to use the drip line during such freezing cold times of the year. When a drip line is used in the conventional manner that is associated with irrigation, water, whether clean or dirty, will remain in the line after irrigation is ceased. So, any subsequent freezing of the water will prevent further use of the dripline until such time as the soil temperature rises above freezing. Furthermore, freezing can damage the valves and devices associated with the dripline. To avoid this problem, in the invention low pressure air is blown through the dripline after the desired amount of irrigation water has been delivered to the soil. Since the preponderance of the water is blown out of the line, by air flow in accord with the invention, and water is carried away from the soil in close vicinity of the emitter, there will be insufficient water left in the dripline, to freeze and cause adverse effects. Drain means, as previously described, may be used in to help ensure the line is drained. Thus, the use of a drip line is made feasible during times of freezing cold soil temperatures. Another gas, including non-oxygen containing gas, may be used as an alternative to air in this aspect of the invention.

Although this invention has been shown and described with respect to one or more preferred embodiments, and by examples, those should not be considered as limiting the claims, since it will be understood by those skilled in this art that various changes in form and detail thereof may be made without departing from the spirit and scope of the claimed invention.

I claim:

1. A method for applying water to soil, which comprises:
   (a) burying a dripline in the soil to a selected depth beneath the surface, wherein the dripline is comprised of a multiplicity of spaced apart pressure compensated emitters; wherein said selected depth provides resistance to upward airflow during step (d);
   (b) flowing water into the dripline, through said emitters, and into the soil;

(c) ceasing the flow of water; and (d) providing air at a greater pressure than atmospheric air to the dripline, so the air flows through substantially all said emitters, and through the soil, to thereby substantially drain water from the dripline and aerate the soil around the dripline.

2. The method of claim 1 wherein said steps are repeated over a prolonged period of time, and wherein low pressure air is provided to and flowed through the dripline for longer periods of cumulative time than is the flow of water.

3. The method of claim 1 wherein the step (d) further comprises: draining at least a portion of the water in the dripline by means of a drain point, other than an emitter.

4. The method of claim 1 wherein the pressure of air in step (e) is in the range 10–100 inches water column (iwc).

5. The method of claim 4 wherein the pressure of water in the dripline during step (b) is at least 5 psig (about 138 iwc).

6. The method of claim 1, wherein the soil in vicinity or one or more emitters has a weak region, which region has higher capacity for flow of air from an emitter than the surrounding soil; and, wherein the pressure of the air provided to the dripline is less than that pressure which causes a significant increase in the flow capacity of the weak region.

7. The method of claim 1 wherein the depth of burial of the emitters of the dripline in the soil is more than 8 inches from the soil surface.

8. The method of claim 1, wherein said air comprises an active gas other than atmospheric air, used alone or in combination with atmospheric air.

9. The method of claim 1 wherein the soil has inconsequential resistance to airflow when the soil is dry.

10. The method of claim 1, wherein the dripline has an inlet end and a terminal end, which further comprises: introducing water and air at the inlet end of the dripline, so the air and water flows toward the terminal end; and, running the drip line in an approximate U-shape loop beneath the surface of the soil, so the terminal end is proximate the inlet end; and, wherein the spacing between the opposing legs of the U-shape is close enough to provide overlapping water and air effect in the soil therebetween.

11. The method of claim 10, further comprising, running two or more said approximately U-shape driplines near one another beneath the soil surface, so the inlet leg of one dripline runs in proximity to the terminal leg of the adjacent dripline, to produce overlapping effect of water from said legs on the soil therebetween.

12. A method for applying water to soil, which comprises:
(a) burying a dripline in the soil to a selected depth beneath the surface, wherein the dripline is comprised of a multiplicity of spaced apart pressure compensated emitters; wherein said selected depth provides resistance to upward airflow during step (e);
(b) flowing water into the dripline, through said emitters, and into the soil;
(c) ceasing the flow of water;
(d) substantially draining water from the dripline; and,
(e) providing low pressure air to the dripline, so air flows through substantially all said emitters and through the soil;

wherein the combination of steps (d) and (e) sufficiently remove water from the drip line, from emitters, and from soil closely adjacent to the emitters, so that if the soil temperature subsequently drops below the freezing point of water, air may be thereafter flowed through a substantial number of said multiplicity of emitters and said closely adjacent soil, unimpeded by freezing of water within the dripline and soil, which would otherwise be present in the absence of steps (d) and (e).

13. The method of claim 1, wherein said water has a significant biological or chemical oxygen demand.

14. In the method of using a dripline having spaced apart emitters for watering soil, wherein the dripline is buried beneath the surface of the soil, the improvement which comprises:
alternately flowing through the dripline water at a first pressure, and then air at a second pressure which is lower than said first pressure of the water, so that said air and said water serially flow through the soil, to thereby improve the distribution of the water within the soil thereby maintain a desired oxygen content in the soil.

15. The improvement of claim 14, wherein, the soil tends to have an oxygen content of less than about 19% when only water, in the absence of air, is flowed through the dripline; and, wherein, when said air at said second pressure is repetitively flowed through the dripline in alternation with said water, the oxygen content of the soil is maintained in the range of about 19–21%.

16. A method for applying water to soil, which comprises:
(a) burying a dripline in the soil to a selected depth beneath the surface, wherein the dripline is comprised of a multiplicity of spaced apertures; wherein said selected depth provides resistance to upward airflow during step (d);
(b) flowing water into the dripline, through said apertures, and into the soil;
(c) ceasing the flow of water; and,
(d) providing air at a greater pressure than atmospheric air to the dripline, so the air flows through substantially all said apertures and through the soil, to thereby substantially drain water from the dripline and aerate the soil around the dripline though the soil, to thereby substantially drain water from the dripline and aerate the soil around the dripline.

* * * * *